United States Patent Office 3,416,944
Patented Dec. 17, 1968

3,416,944
ABLATIVE PRODUCT AND METHOD FOR ITS MANUFACTUR
Paul F. Pirrung and Donald L. Schmidt, Dayton, Ohio, assignors to the United States of America as represented by the Secretary of the Air Force
No Drawing. Filed Oct. 26, 1964, Ser. No. 406,623
5 Claims. (Cl. 117—46)

ABSTRACT OF THE DISCLOSURE

An ablative product and the method of making the same comprising the steps of impregnating a pyrolyzed graphite fabric with a phenolic resin, heat drying said impregnated fabric, pyrolyzing said fabric over a gradual temperature rise from room temperature to 1900° F. in a period of 18 hours, cooling said fabric to room temperature, heating said fabric up to 4600° F. in about one hour, maintaining the fabric at 4600° F. for four hours, and forming a pyrolytic graphite deposit on said fabric by contacting said fabric with a mixture of 20–70 percent volume of propane in a carrier gas at a temperature of 3500–4500° F. for a period of time until the requisite pyrolytic deposit is obtained on the fabric.

---

The invention described herein may be manufactured and used by or for the United States Government for governmental purposes without payment to us of any royalty thereon.

This invention is in the art of high temperature structural materials, particularly of the ablative radiative type with characteristics rendering them adaptable for use in rocket engines, including the exhaust portions and nozzles as well as the liquid propellant thrust chambers thereof, in nose cones and heat shields for geo-atomspheric exit and re-entry vehicles, in leading edges and fins of ultra high speed aircraft and the like. The invention also involves a method for the manufacture of such materials.

To meet the demands of the hyperthermal environments being encountered with increasing frequency in applications of the type enumerated above, the prior art has created several classes of materails which are useful at very high temperatures and variable exposure periods, depending upon the specific chemical composition and environmental parameters (temperature, heat flux, chemical reactivity, etc.). One such class of materials is the chemically vapor-plated compositions, also known as pyrolytically deposited materials. They are of a pyrolytic graphite, pyrolytic graphite containing small percentages of various metals (zirconium, titanium, etc.) or non-metals (boron), nitrides of metals (like titanium) and non-metals (boron), and carbides of metals (hafnium, niobium, zirconium and the like) and non-metals (boron and the like). The most advanced pyrolytic materials are of a pyrolytic graphite or alloy thereof composition, which exhibit highly desirable anisotropic properties, thermal stability, surface emission, low vaporization at high temperatures, strength at high temperatures, high sublimation temperature, low gas permeability, erosion resistance, excellent surface finish and high hardness, as compared to conventional bulk graphitic materials. The pyrolytic graphite composition materials have certain deficiencies, however, which include: internal stresses, high costs, fabrication difficulty, limitation in size of part produced, difficulty in attachment, brittle fracture characteristics, high density, and relatively low room-temperature mechanical properties.

A second class of structural materials are produced by the carbonization of char-producing polymeric, plastic or resinous substances. Included among these ablative charring plastic materials are the phenolics and modified phenolics such as phenol-formaldehyde, phenol-furfural, resorcinol-formaldehyde, phenyl silane and phenol-aldehydes such as resole, novolac, cresol and xylenol. While these ablative charring plastic materials also include other materials such as furanes, polyimides, polybenzimidazoles, melamines, polyphenylenes and epoxies, especially the novolac epoxies, primary attention is currently focused upon the phenolic and phenolic-base laminating resins because they have been found capable of producing among the highest percentages of carbon residue or char and the best structural properties upon their exposure to relatively high temperatures on the order of from 600° to 5500° Fahrenheit. Still more recently, these plastics as matrix components have been fiber reinforced, usually with carbonaceous composition (amorphous to crystalline forms) fabrics of the type produced by the pyrolysis in an inert non-oxidizing or hydrocarbon atomsphere of a variety of filamentous yarns, such as those of cellulose, cellulose-base (rayon), polyamide (HT–1), acrylic (orlon) and the like.

These pyrolyzed plastic composite materials have exhibited relatively good high-temperature thermal stability high surface radiative emittance, elastic non-brittle behavoir and low thermal conductivity in hyperthermal environments. In addition, they are relatively easy to fabricate in complex shapes, can be produced in large sizes, and they readily accept oxidation-protective coatings of varying compositions. However, their porosity, susceptibility to oxidation and strength characteristics have limited them to ablative applications involving a minimum of mechanically eroding forces such as dynamic gas shear, stagnation pressure and little or no oxidation or other chemically degrading influences. Thus, although the pyrolyzed plastics have demonstrated substantial high temperature capabilities in certain respects and would normally suggest themselves for aeronautical and astronautical use because of their light weight, their limitations have prevented their successful utilization in many such applications which are vital to our advancing technology if not to our military defense.

It is accordingly an object of the invention to provide a high temperature structural material characterized by improved resistance to mechanical erosion, oxidation, heat, and chemically reactive species such as might be encountered when the material is exposed to the high energy flow of reactive gas streams or other sources of high particle impact.

Another object of the invention is to provide a thermally stable structure composite wherein one component will be porous and therefore light in weight, but will at the same time be free of the disadvantages which have been inherent in such porous and light weight materials as were known prior to this invention.

Still another object of the invention is to provide such a material which will possess and retain such high temperature structural properties as will render it suitable for use in rocket engines, particularly in the linings of the exhaust sections and nozzles thereof, and in heat shields, nose cones, leading edges, fins and the like.

Still another object of the invention is to provide a reasonable expedient and economical method for the manufacture and fabrication of such a composite material.

To achieve these and other objects and advantages which will be apparent from a reading of the within disclosure, the invention teaches the use of the charred or carbonized plastic compositions of the type known to the prior art as substrates which are provided with an impervious surface film or coating of a controllable thickness and of a refractory substance deposited thereon by conventional or only nominally modified vapor plating techniques involving a gas phase deposition reaction of the volatilized refractory material. Further teachings of this invention, concerning primarily the heat treatment of the substrate after it has been carbonized but prior to the vapor deposition of a coating thereon, make possible a heretofore unobtainable integration and permanence of association between the coating and the substrate which render the composite a truly unitary mass having essentially the strength and light weight of the charred substrate on the one hand and the surface properties and resistance to chemical degradation of the deposited pyrolytic film on the other. The surface and the immediate sub-surface characteristics of the unitary structural unit thus composed are therefore identical to those normally associated with the pure refractory material of the coating. While this heat treatment of the substrate has been successfully carried out at temperatures and over the time periods hereinafter detailed, it is believed generally that the improved results of this invention may be achieved in all situations wherein the heat treating of the carbonized substrate is such as partially to change the carbon therein or at least near the surfaces thereof from an amorphous to a crystalline form and to drive off volatiles within the substrate to the extent that it will undergo no substantial weight loss upon further exposure to high temperatures, even up to those at which it will be ultimately heated in the vapor deposition process. Where these conditions are achieved, it has been observed that the vapor-plated coating penetrates at least the surface and surface-adjoining open cell pores and cracks of the substrate.

The resultant composite of pyrolytically deposited coating and substrate pyrolyzed plastic is strongly bonded together by physico-chemical forces and mechanical points of attachment. Physico-chemical bonding is produced by the reaction and deposition of pyrolytic atoms or particles with the heat-cleaned substrate. Mechanical interlocking of the pyrolytic coating with the substrate is achieved by penetration of the deposited material into the open-cell pores and cracks until they have been filled.

It has been found that this integration between the coating and the substrate can be further improved in those cases in which the coating is applied by vapor deposition by diluting the volatilized refractory gas with an inert gas or by causing the gas-phase reaction to take place in a partial vacuum or by both. It is theorized that the dilution of the refractory gas results in the gas-phase formation of smaller particles of the material which are then plated out with the result that they are more able to enter the pores, no matter how small, of the substrate. The creation of a partial vacuum increases the mean free path of the reactants in the gaseous phase, reduces the number of pyrolytic particles colliding in the gaseous phase resulting in smaller size particle buildup, increases the percentage of gaseous molecules reacting on the heated surface or in the pores, and reduces the frequency of collision between the gaseous reactants moving toward the surface and the gaseous products of reaction moving away from the surface. We have found that the shear strength at room temperature of the interfacial bond between the deposited coating and the substrate generally exceeds 650 p.s.i. and is stronger in shear as compared to the substrate. Moreover, thermal shock tests have also demonstrated the strength of the interfacial bond. Pyrolytic graphite coated pyrolyzed plastic specimens have been exposed on one side to very high temperature (over 10,000° Fahrenheit) air and nitrogen plasmas without spalling the coating from the substrate. This structural integrity is quite unlike that experienced with most coated articles wherein the thermo-physical properties of the coating and substrate differ by a large degree and spallation during thermal shocking invariably occurs. Moreover, it was discovered that the nitrogen and argon plasmas from an electric arc heater polished or increased the smoothness of the pyrolytic graphite coating, eliminating any rough edges.

Whereas, during the carbonization of the substrate it has been found desirable to control the pyrolysis over a period of time by elevating the temperature to from 1800° to 2200° Fahrenheit over a 14 to 22 hour period, the subsequent heat treating of the substrate thus carbonized should, according to the teachings of this invention, be at temperatures ranging from 4000° to 4750° Fahrenheit and upward for a period of from two to six hours. For pyrolytic graphite and alloys thereof, carrying out the vapor plating reaction at elevated temperatures of 3500° to 4500° Fahrenheit improves the crystalline structure of the plated coating and eliminates to some degree soot particles which act as defects and interfere with the imperviousness and continuity of the plated coating and also is believed to interfere with the thoroughness of the pore penetration and the efficacy of the ultimate bond between the substrate and coating. It has also been found that where pyrolyzed carbonaceous fabrics of the type generally described above are employed as reinforcements in the substrate, they will respond to the heat treating in a manner somewhat similar to that of the matrix in which they are embedded with the result that they will themselves be integrated with the vapor-plated coating in the same manner as the matrix.

While the teachings of this invention are applicable to the deposition of a wide variety of refractory coatings upon many different substrates, the invention is particularly adaptable to the application of a vapor-plated pyrolytic graphite coating and alloys thereof to a charred carbonaceous substrate, with or without carbon-based fiber reinforcement. In a specific embodiment of this invention, for example the manufacture of the leading edge of a high speed airfoil or the nose cone of a re-entry space vehicle, a reinforcing fabric, for example a crosswoven pyrolyzed graphite cloth is impregnated by wetting the fabric surface with a laminating resinous material such as 91 LD phenolic resin (manufactured and sold by U.S. Polymeric Company) and then air or oven drying at elevated temperatures. At this point, the laminating resin is in the so-called "B Stage" at which it may be shaped and contoured. One or several layers of the resin impregnated fabric may therefore be superimposed about a suitable forming surface and then subjected to compression molding in a press; and, in the case of the phenolic resin mentioned, cured under a pressure of 200 pounds per square inch for 60 minutes at 325° Fahrenheit whereupon it is removed from the press and subjected to a post-cure for 16 hours at 275° Fahrenheit at atmospheric pressure.

The product thus molded is then subjected to controlled pyrolysis in an inert, reducing or hydrocarbon atmosphere such as may be provided by surrounding the object with a mixture of sawdust and finely divided particulate calcined coke or by incorporating an inert gas into the heating chamber such as an electric furnace in which the product is placed and slowly heated from room temperature to 1900° Fahrenheit over a period of 18 hours. As soon as the formed substrate reaches this temperature, the electrical power to the furnace is discontinued and the substrate is allowed to cool back to room temperature.

At this point, the laminating resin has been reduced to a high carbon content porous char residue in a form. The thermal processing does not stop at this point however; for, according to the teachings of this invention, the charred substrate is further heat treated in a furnace wherein the temperature may be increased from room temperature to 4600° Fahrenheit in about one hour. After this temperature is achieved, the substrate is heated at the elevated temperature for an additional four hours whereupon the furnace power is turned off and the substrate allowed to cool back to room temperature. An inert atmosphere such as a helium or argon gas in the heat-treating furnace is preferred.

As evidence of the effects of this thermal processing upon the volatiles within the substrate, it is observed that after the carbonization at 1900° Fahrenheit, the substrate lost from 10% to 14% of its original weight; whereas after the heat-treating and heat-soaking at 4600° Fahrenheit, the substrate was found to have lost the additional weight of from 4% to 10% of its weight as it existed after carbonization. Similarly it is noted that, whereas upon completion of the carbonization, the flexural strength of the substrate decreased as compared to the virgin material. Upon graphitization in the heat-treating process, it increased to 14,000 pounds per square inch, approximately twice that of the carbonized substrate.

The substrate thus thermally prepared is then placed in a vapor-deposition chamber which, in a preferred example, may be a furnace or other hermetically sealed chamber which may be initially filled with an inert atmosphere while the substrate is brought up to a suitable plating temperature of from 3500° to 4500° Fahrenheit depending upon the composition of the reactant vapor and the deposited structure desired. At this point, the volatilized plating compound (reactant) such as propane gas thoroughly mixed with a carrier gas such as hydrogen or helium is introduced, the propane representing 20 to 70 volume percent of the total gas. To form a pyrolytic graphite deposit containing up to several weight percent of a metallic or non-metallic chemical element, one-fourth of one volume percent to three-fourths of one volume percent of the hydrocarbon propane gas should be replaced with the appropriate metallic or non-metallic halide. To illustrate, gaseous boron trichloride was used to obtain a boron-containing pyrolytic graphite and titanium tetrachloride was used to obtain a titanium-containing pyrolytic graphite deposit. As the reactant gas or plating compound passes over the heated substrate, the gas is decomposed or reduced and one component of the compound, in this case the carbon, is continuously deposited on the heated substrate surface. The remaining gaseous reaction products and carrier gases are continuously expelled from the reaction chamber. In lieu of heating the substrate in a furnace to the temperature at which the plating reaction will take place, the substrate may be brought to plating-temperature as by electrical resistance heating, after which an atmosphere containing the volatilized plating compound in the proper proportions is introduced.

The substrate may be resistance heated by suitable connection with two water-cooled electrodes whereby the substrate, upon electrical energization of the copper plates, will bridge the gap between the electrodes thus completing the circuit. When employing this procedure of heating, it will be necessary to constantly change the electrical power to the electrodes in order to maintain a constant surface temperature for the substrate material. For the case of pyrolytic graphite deposition, we monitored the surface temperature of the substrate with an optical pyrometer and continuously decreased the electrical power to the electrodes to maintain a constant surface temperature. This procedure can be automated by feeding the radiation output from the optical pyrometer and the power setting for the electrodes into a null point instrument.

While the temperature of the substrate at the time the plating reaction takes place appears to be the most important variable that influences the nature of the deposits, other process variables affect the plating reaction and play an important part in this invention. The pressure maintained within the reaction chamber affects the particle size of the refractory material being deposited upon the substrate. In order to keep the size of the deposited particles to a reasonable minimum such that they can penetrate the surface pores of the substrate, the reaction pressure should be lower than atmospheric.

Similarly, the concentration of the reactant gas in the total gaseous mixture affects the particle size of the deposited coating, the smaller particles being obtained where lower concentration of the reactive gases are employed.

The time within which the substrate is allowed to remain in the vapor-plating reaction will influence the thickness of the coating being plated thereon. In the case of the example, the chamber pressure was maintained at three (3) p.s.i.a. The substrate was maintained continuously at 3700° Fahrenheit and plating was effected for a total of 20 minutes. The reactant gases of propane constituted 58 volume percent of the total flow, with the remainder of the flow composed of hydrogen. A pyrolytic deposit of approximately 0.018 inch thick was obtained on the substrate.

The specimen formed by the specific example described has all of the attributes sought by the invention, chief among which are the unique combination of these two materials (the coating and substrate) to contribute to easy fabricability, light weight construction exhibiting a surface with good resistance to mechanical and chemical erosion with the total composite specimen exhibiting extreme resistance to degradation at high temperatures.

The density of the partially graphitized substrate is 1.25 gm./cc. The partially graphitized substrate is almost 100% carbon and is therefore very thermally stable. The carbonized substrate was shown to have a flexural strength of approximately 7000 p.s.i. while the partially graphitized substrate exhibited a flexural strength of approximately 14,000 p.s.i. The specific flexural strength (flexural strength divided by specific gravity) at room temperature for the partially graphitized substrate is greater than 6000 p.s.i. while the specific flexural strength for ATJ bulk graphite (a high strength commercial graphite manufactured and sold by National Carbon Division, Union Carbide Corporation) is about 2320 p.s.i.

The easy fabricability can be seen from the state of the art for fabrication of plastic-fabric composites.

X-ray diffraction has proven the coating to be graphitic in nature and photo-micro graphs have shown that the coating has a pyrolytic graphite structure. The photo-micro graphs also show that the pyrolytic graphite has also impregnated the pores of the substrate.

The density of the pyrolytic graphite coating was very close to its theoretical density since it was as high as 2.21 gm./cc.

Pyrolytic graphite has been shown to have a higher oxidation resistance than other graphites.

While the foregoing invention has been described in detail in connection with certain preferred and specific embodiments thereof, it is to be understood that the particularization herein has been for the purposes of illustration only and does not limit the scope of the invention as it is more precisely defined in the subjoined claims.

We claim:

1. A method of making an ablative product comprising the steps of
    (a) impregnating a pyrolyzed graphite fabric with a phenolic resin,
    (b) heat drying said impregnated fabric,
    (c) pyrolyzing said fabric over a gradual temperature rise from room temperature to 1900° F. in a period of 18 hours,
    (d) cooling said fabric to room temperature,
    (e) heating said fabric up to 4600° F. in about one hour,
    (f) maintaining the fabric at 4600° F. for four hours, and
    (g) forming a pyrolytic graphite deposit on said fabric by contacting said fabric with a mixture of 20–70 percent volume of propane in a carrier gas at a temperature of 3500–4500° F. for a period of time until the requisite pyrolytic deposit is obtained on the fabric.

2. The method of claim 1 in which step (g) is carried out at 3700° F. for 20 minutes in 58 percent volume of propane in the carrier gas hydrogen to produce a deposit of .018 inch thick.

3. The method of claim 1 in which several layers of the graphite fabric are formed into a laminate under a pressure of 200 p.s.i. for 60 minutes at 325° F. and thereafter post-cured for 16 hours at 275° F. at atmospheric pressure prior to the step of pyrolyzing the fabric.

4. The method of claim 1 wherein a pyrolytic graphite-boron deposit is formed on said fabric by replacing one-fourth of one volume percent to three-fourths of one volume percent of the propane with $BCl_3$.

5. The ablative product made by the process of claim 1.

References Cited

UNITED STATES PATENTS

| | | | |
|---|---|---|---|
| 2,853,969 | 9/1958 | Drewett | 117—46 |
| 2,922,722 | 1/1960 | Hutcheon | 117—46 |
| 2,972,552 | 2/1961 | Winter | 117—46 |
| 3,177,084 | 4/1965 | Amstein | 117—46 |
| 3,206,331 | 9/1965 | Diefendorf | 117—46 |
| 3,216,195 | 11/1965 | Keon | 117—46 |
| 3,238,054 | 3/1966 | Bickerdike et al. | 117—46 |
| 3,242,000 | 3/1966 | Lynch | 117—46 |
| 3,252,824 | 5/1966 | Whaley | 117—107.2 |

MURRAY KATZ, *Primary Examiner.*

U.S. Cl. X.R.

117—47, 106, 160; 60—35.6